United States Patent [19]

Schubert et al.

[11] Patent Number: 5,082,643
[45] Date of Patent: Jan. 21, 1992

[54] PROCESS AND CATALYST FOR THE CONVERSION OF CO/H₂O MIXTURES

[75] Inventors: Ulrich Schubert, Würzburg; Klaus Rose, Kitzingen, both of Fed. Rep. of Germany

[73] Assignee: Fraunhofer-Gesellschaft zur Förderung der Angewandten Forschung E.V., Munich, Fed. Rep. of Germany

[21] Appl. No.: 257,803

[22] Filed: Oct. 14, 1988

[30] Foreign Application Priority Data

Oct. 16, 1987 [DE] Fed. Rep. of Germany ....... 3735127

[51] Int. Cl.⁵ .................. C01B 31/18; C01B 3/12
[52] U.S. Cl. .................. 423/415 R; 423/437; 423/655; 423/656; 502/150
[58] Field of Search ............... 423/415, 437, 656, 655; 556/7; 502/261

[56] References Cited

U.S. PATENT DOCUMENTS

| | | | |
|---|---|---|---|
| 4,298,541 | 11/1981 | Oswald et al. | 556/7 |
| 4,442,040 | 4/1984 | Panster et al. | 556/7 |
| 4,810,485 | 5/1989 | Marianowski | 423/648.1 |

*Primary Examiner*—Gary P. Straub
*Assistant Examiner*—Timothy C. Vanoy
*Attorney, Agent, or Firm*—Oblon, Spivak, McClelland, Maier & Neustadt

[57] ABSTRACT

The conversion of CO/H₂O mixtures, in particular water gas, is carried out in the presence of solid, polymer rhodium complex catalysts which are insoluble in aqueous and organic solvents and are obtainable by polycondensation of one or more rhodium complexes having at least one ligand which contains at least one group capable of coordinating to rhodium and at least one group forming an inorganic network in the polycondensation, either with itself or with one or more inorganic network-forming agents capable of undergoing polycondensation. Novel rhodium complexes of this type are also described.

25 Claims, No Drawings

PROCESS AND CATALYST FOR THE CONVERSION OF CO/H₂O MIXTURES

TECHNICAL FIELD

The invention relates to a process and catalysts for the conversion of $CO/H_2O$ mixtures, in particular water gas.

BACKGROUND ART

The conversion of water gas is carried out in industry mainly by using oxidic heterogeneous catalysts, which, however, are only effective at relatively high temperatures of, for example, 200° to 500° C.

Furthermore, catalysts are known which catalyse the reaction in a homogeneous phase, for example soluble rhodium compounds such as $Rh_6(CO)_{16}$. However, these homogeneous catalysts have the disadvantage that they are difficult to separate off, thus requiring subsequent work-up procedures.

SUMMARY OF THE INVENTION

The object of the invention is therefore to provide a process and catalysts for the conversion of $CO/H_2O$ mixtures in which heterogeneous catalysis under mild conditions and without complicated workup procedures is possible.

The invention relates to a process for the catalytic conversion of $CO/H_2O$ mixtures using rhodium complex catalysts, which process comprises carrying out the reaction in the presence of solid, polymer rhodium complex catalysts which are insoluble in aqueous and organic solvents and are obtainable by polycondensation of one or more rhodium complexes having at least one ligand which contains at least one group capable of coordinating to rhodium and at least one group forming an inorganic network in the polycondensation, either with itself or with one or more inorganic network-forming agents capable of undergoing polycondensation.

The catalysts mentioned catalyse the following two reactions:

$$CO + H_2O \rightarrow CO_2 + H_2;$$

$$CO + \tfrac{1}{2}O_2 \rightarrow CO_2;$$

Therefore, they are particularly suitable for the preparation of $H_2$ from $CO/H_2O$ mixtures, but possibly also for the generation of $CO_2$. These final products can be used, for example, for the synthesis of ammonia or in $C_1$ chemistry.

DETAILED DESCRIPTION OF THE INVENTION

In contrast to conventional processes, the process according to the invention can be carried out under relatively mild conditions. The reaction temperature is usually in the range from 10° to 200° C., preferably 50° to 100° C. The process can be carried out at atmospheric pressure, reduced pressure or superatmospheric pressure, the reaction pressure generally being in the range from 0.001 to 300 bar, preferably 0.1 to 50 bar. Preference is given to working at atmospheric pressure.

The process according to the invention can be carried out continuously, batchwise or intermittently, for example in tubular reactors, autoclaves, fluidized bed, solid bed or moving bed reactors.

For the conversion, the catalyst is brought into contact with a $CO/H_2O$ mixture, for example a CO stream or water gas saturated with $H_2O$. The gas mixture used can optionally contain $O_2$ (preferably in an amount of 0 to 20% by volume, based on CO) and/or inert gases such as, for example, $N_2$.

In a different embodiment of the process according to the invention, a catalyst moistened with water is used over which a CO stream is passed. The water losses which occur during the reaction can be compensated for, for example, by dropwise addition of water to the catalyst.

The catalysts used according to the invention are solid, polymer rhodium complex catalysts which are insoluble in aqueous and organic solvents and are obtainable by polycondensation of one or more rhodium complexes having at least one ligand which contains at least one group capable of coordinating to rhodium and at least one group forming an inorganic network in the polycondensation, either with itself or with one or more inorganic network-forming agents capable of undergoing polycondensation.

Catalysts of this type are described, for example, in German Offenlegungsschrift 3,029,599.

A preferred group of the rhodium complexes used for the preparation of the catalyst has the general formula (I):

$$[L_aL'_bRhX_c]_d \qquad (I)$$

in which L is a ligand containing an electron-donating group capable of coordinating to rhodium, preferably a phosphine group and a group forming an inorganic network in the polycondensation, for example an alkoxysilane, alkoxyaluminum, alkoxytitanium or alkoxyboron group; L' is an electron-donating ligand different from L, preferably a phosphine, carbonyl or amino ligand; X is an organic or inorganic anion necessary for charge neutralization, preferably a halide, hydride or alcoholate anion or an anion of organic or inorganic acids; a has a value from 1 to 4, preferably the value 1, 2 or 3; b has a value from 0 to 4, preferably the value 0, 1 or 2; c has a value from 0 to 3, the sum (a+b+c) being smaller than or equal to 6; and d is a whole number having a value greater than or equal to 1, preferably the number 1, 2, 4 or 6.

Typical ligands L have, for example, the general formula:

$$PR_2(CH_2)_nSi(OR')_3$$

in which R denotes in particular alkyl (preferably $C_1-C_6$), cycloalkyl (preferably $C_6$), aryl (preferably $C_6-C_{10}$) or aralkyl (preferably benzyl); R' is alkyl (preferably $C_1-C_6$) and n has a value from 1 to 10, preferably the value 1, 2, 3 or 4.

A specific example of such ligands L is the ligand:

$$P(C_6H_5)_2(CH_2)_2Si(OC_2H_5)_3$$

Specific examples of electron-donating ligands L' are mentioned in German Offenlegungsschrift 3,029,599 such as, for example, CO, NO, $P(C_6H_5)_3$, $As(C_6H_5)_3$, phosphite, amine, sulfide, olefin, diolefin, acetylene, nitrile, isonitrile, cyanate, isocyanate and water.

Specific examples of the anion X are also mentioned in German Offenlegungsschrift 3,029,599, for example the chloride, bromide, iodide, nitrate, acetylacetonate, acetate, trifluoroacetate, trichloroacetate, propionate, methoxide, ethoxide, propoxide, butoxide, phenolate, perchlorate, tetraphenylborate, hexafluorophosphate, methanide, ethanide, propanaide, butanide, benzenide or perfluorobenzenide ion, optionally replacing these anions completely or partially by the hydride ion.

The rhodium complexes used for preparing the catalyst can have, for example, the formula $Rh(CO)ClL_2$ or $RhCl_3L_3$. The preparation of rhodium complexes of the formula $Rh(CO)ClL_2$ where L is $P(C_6H_5)_2(CH_2)_2Si(OC_2H_5)_3$ has been described, for example, in German Offenlegungsschriften 2,062,351 and 2,062,352.

A further preferred group of rhodium complexes used for the preparation of the catalyst has the general formula (II)

$$\{[L'_bRhX_c]_d\}L''_a \qquad (II)$$

in which L" is a ligand containing an ionic group capable of coordinating to rhodium, preferably an ammonium group, and a group forming an inorganic network in the polycondensation, preferably an alkoxysilane, alkoxyaluminum, alkoxytitanium or alkoxyboron group; L' is an electron-donating ligand, preferably a phosphine, carbonyl or amino ligand; X is an organic or inorganic anion necessary for charge neutralization, preferably a halide, hydride or alcoholate anion or is an anion of organic or inorganic acids; a has a value necessary to neutralize the charge of the complex anion or cation; b has a value from 0 to 4, preferably the value 0, 1 or 2; c' has a value from 0 to 6, the sum (b+c') being smaller than or equal to 6; and d is a whole number having a value greater than or equal to 1. The values of a which are frequently encountered are the values from 1 to 4, in particular 1, 2 and 3. Typical ligands L" have, for example, the general formula:

$$R_mN[(CH_2)_n-Si(OR')_3]_{4-m}$$

in which
R denotes hydrogen, alkyl (preferably $C_1-C_6$), cycloalkyl (preferably $C_6$), aryl (preferably $C_6-C_{10}$) or aralkyl (preferably benzyl);
R' represents alkyl (preferably $C_1-C_6$);
X is an organic or inorganic anion necessary for charge neutralization, preferably a halide anion;
m has a value from 0 to 3, preferably the value 1, 2 or 3; and
n has a value from 1 to 10, preferably the value 1, 2, 3 or 4.

The invention relates to novel rhodium complexes of this type having the general formula (III):

$$R_mN[(CH_2)_n-Si(OR')_3]_{4-m}[Rh(CO)_2X_2]$$

in which R, R', X, m and n have the above meanings. A specific rhodium complex of this type has the formula (IV):

$$(CH_3)_3N[(CH_2)_3-Si(OCH_3)_3][Rh(CO)_2Cl_2].$$

In the rhodium complexes described above, radicals L, L', L", R, R' and X appearing more than once can have the same or different meanings.

The rhodium complex catalysts used according to the invention are prepared by polycondensation of one or more of the abovementioned rhodium complexes either with themselves or with one or more inorganic network-forming agents capable of undergoing polycondensation with the formation of an inorganic network.

Preferred inorganic network-forming agents are compounds of silicon, titanium, aluminum and/or boron, in particular alkoxides and halides thereof, which are capable of undergoing polycondensation. Particularly preferred network-forming agents are alkoxysilanes which produce a network of silicates in the cocondensation.

The polycondensation is usually carried out in a water-miscible organic solvent in the presence of the minimum amount of water required by stoichiometry for the hydrolysis of the groups capable of undergoing polycondensation and also possibly in the presence of a condensation catalyst.

Examples of solvents which can be used are alcohols such as methanol, ethanol, n-propanol or isobutanol, ketones such as acetone, ethers such as tetrahydrofuran or dioxan and acetonitrile. Suitable condensation catalysts are acids or bases, inorganic acids such as phosphoric acid being preferred. The water is usually employed in excess, relative to the groups capable of being hydrolyzed, for example in a 7-fold molar excess. In this procedure, the corresponding amount of aqueous acid can be used, which in this case contains not only the catalytically active $H^+$ ions but also the amount of water necessary for hydrolysis. The amounts of rhodium complex to inorganic network-forming agent can be chosen in any desired ratio. By virtue of the ratio of the amounts and also the reaction conditions of the sol/gel process, specifically the amount of acid and water and also the type of acid, the chemical and physical properties of the product obtained can be influenced as desired, for example the rhodium content, the specific area, pore size and density.

The rhodium complex catalysts obtained in the manner described are solid, polymer substances insoluble in aqueous and organic solvents. If necessary, they can be freed from condensation catalyst by rinsing and then dried.

The immobilization in an inorganic, for example a silicate network, is an important factor for the catalytic action of the catalysts according to the invention in the conversion of $CO/H_2O$ mixtures. While the reactions described, for example, in German Offenlegungsschrift 3,029,599 are catalyzed even by soluble (homogeneous) rhodium complexes, the water gas reaction is catalyzed only in a heterogeneous phase, that is, immobilization of the rhodium complex in an inorganic network is required. Without a network, no catalytic action is observed.

Compared with conventional catalysts for the conversion of water gas, the catalysts used according to the invention have, inter alia, the following advantages:
 low operating temperature, reaction at atmospheric pressure;
 solid state of the catalyst;
 metal content of the catalyst easily variable by virtue of the mixing ratio of network-forming agent and rhodium complex;
 physical properties of the carrier material selectively adjustable via the sol/gel process;
 homogeneous distribution of the rhodium in the catalyst; that is, no loss of activity even in the case of mechanical wear.

The examples which follow illustrate the invention.

EXAMPLE 1

Preparation of a Rhodium Complex Catalyst by CoCondensation of $(CH_3)_3N[(CH_2)_3-Si(OCH_3)_3][(Rh(CO_2)_2Cl_2]$ with $Si(OCH_3)_4$ To a solution of 1.06 g (2.73 mmol) of $[Rh(CO)_2Cl]_2$ in 50 ml of methanol are added under $N_2$ initially 50 ml of 37% strength HCl and, after stirring for a short time, 2.11 g (8.19 mmol=4.55 ml of a 50% strength solution in methanol) of $[(CH_3)_3N(-CH_2-)_3-Si(OCH_3)_3]^+Cl^-$ and immediately thereafter 16.6 g (109.2 mmol) of $Si(OCH_3)_4$.

Within a short period, a light yellow precipitate is formed. After adding another 25 ml of methanol, the suspension is stirred at room temperature for 2.5 days. The solid is filtered off, solvent residues are removed at 60° C./$10^{-1}$ torr and the solid is finally dried at 50° C./$10^{-3}$ torr. IR spectrum (nujol):$\nu_{CO}=2,068$ (vs), 1,996 (vs) cm$^{-1}$.

EXAMPLE 2

Preparation of a Rhodium Complex Catalyst by CoCondensation of $Rh(CO)Cl[P(C_6H_5)_2CH_2CH_2Si(OC_2H_5)_3]$ with $Si(OC_2H_5)_4$ 1.04 g (5 mmol) of $Si(OC_2H_5)_4$ and 0.46 g (0.5 mmol) of $Rh(CO)Cl[P(C_6H_5)_2CH_2CH_2Si(OC_2H_5)_3]_2$ are dissolved in acetone. After the addition of 2.9 ml of 2.8 n $H_3PO_4$, the mixture is vigorously stirred for a short time and then allowed to stand at 20°-25° C. After 48 hours, the solvent has completely evaporated.

The remaining residue is stirred in 30 ml of water at 20°-25° C. for 2 hours, then filtered off through a sintered-glass crucible and washed with water until the eluate gives a neutral reaction, and then with acetone until the eluate remains colorless. The solid substance is then dried at 60° C. and 0.01 torr for 16 hours.

The material thus prepared still contains water and uncondensed OH groups which, however, do not impair the catalytic reaction since it is carried out with moist catalyst in the first place.

Elemental analysis: Calculated values (based on completely condensed, anhydrous material): C 26.8, H 2.2, Rh 7.9. Found: C 21.9, H 2.8, Rh 7.8. BET surface area 215 m$^2$/g.

EXAMPLE 3

Procedure of the Catalytic Reactions a) Continuously

Experimental set-up: The catalyst (as obtained in Example 1 or 2) is present in a vertical 3 cm wide tube, which is sealed at the bottom by a fritted disk and maintained at a constant temperature by means of a heated jacket. The catalyst is lying on top of the fritted disk and the gas mixture flows through it from the bottom. Before making contact with the catalyst, the CO used for the reaction is passed through a flask containing hot water (about 100° C.) and becomes saturated with $H_2O$. After the reaction on the catalyst, the gas mixture is passed either into a mass spectrometer (for qualitative determination of $H_2$ and $CO_2$) or into an aqueous $Ba(OH)_2$ solution (for quantitative determination of $CO_2$).

Procedure: 0.5 to 1.5 g of the catalyst are placed on the fritted base and moistened with 3 drops of water. The temperature of the reaction zone is maintained constantly at 70° C. and the flow rate of the gas at 20 ml/min.

After the reaction time of 1 hour using the catalysts prepared according to Example 2, the following $CO_2$ amounts were found (TN = conversion numbers):

| Catalyst Rh/Si | $CO_2$ formed | | TN [mmol of $CO_2$/ mmol of Rh × h] |
|---|---|---|---|
| | Amount [mg] | Amount [mmol] | |
| 1:30 | 500 | 6.0 | 33 |
| | 1,500 | 6.6 | 13 |
| 1:50 | 500 | 6.4 | 60 |
| | 1,500 | 7.5 | 23 |
| 1:70 | 500 | 3.3 | 38 |
| | 1,500 | 6.9 | 25 |

*Cocondensates consisting of the corresponding amounts of $Rh(CO)Cl[P(C_2H_5)_2CH_2CH_2Si(OC_2H_5)_3]_2$ and $Si(OC_2H_5)_4$. BET specific areas of the materials used: 1:30 = 550 m$^2$/g, 1:50 = 630 m$^2$/g, 1:70 = 695 m$^2$/g.

Completely analogous yields are obtained if polycondensates prepared from $[(CH_3)_3N(CH_2)_3Si(OCH_3)_3][Rh(CO)_2Cl_2]$ or $RhCl_3(P(C_6H_5)_2CH_2CH_2Si(OC_2H_5)_3)_2$ are used.

b) Batchwise 1.0 g of catalyst is placed in a 100-ml flask, and 10 ml of water are added. By evacuating for a short time and subsequent aerating with CO, the flask is filled with CO under atmospheric pressure (1 atm).

The catalyst is then kept at a constant temperature in the sealed flask for 15 hours. After this amount of time, the gaseous components in the flask are bubbled through an aqueous $Ba(OH)_2$ solution to determine the corresponding quantity of $CO_2$.

Yield of $CO_2$, if the catalysts prepared according to Example 2 are used:

Rh/Si=1:30; T=100° C.; TN=62 [mmol of $CO_2$/mmol of Rh].

Rh/Si=1:50; T=52° C.; TN=52 [mmol of $CO_2$/mmol of Rh].

Completely analogous yields are obtained if polycondensates prepared from $[(CH_3)_3N(CH_2)_3Si(OCH_3)_3][Rh(CO)_2Cl_2]$ or $RhCl_3(P(C_6H_5)_2CH_2CH_2Si(OC_2H_5)_3)_2$ are used.

We claim:

1. A process for the catalytic conversion of $CO/H_2O$ mixtures to $CO_2$ or a mixture thereof with $H_2$, using rhodium complex catalysts, which process comprises carrying out the reaction in the presence of solid, polymer rhodium complex catalysts which are insoluble in aqueous and organic solvents, obtained by polycondensation of one or more rhodium complexes having at least one ligand which contains at least one group capable of coordinating to rhodium and at least one group forming an inorganic network in the polycondensation with itself;

wherein the rhodium complex has the general formula I:

$$(L_aL'_bRhX_c)_d \quad (I)$$

in which L is a ligand containing an electron-donating group capable of coordinating to rhodium and a group forming an inorganic network in the polycondensation; L' is a electron-donating ligand different from L; X is an organic or inorganic anion necessary for charge neutralization; a has a value from 1 to 4; b has a value from 0 to 4; c has a value from 0 to 3, the sum (a+b+c) being smaller than or equal to 6; and d is a whole number having a value greater than or equal to 1; and wherein L is a phosphine as coordinating group, an alkoxysilane, alkoxyaluminum, alkoxy titanium or alkoxyboron group as inorganic network forming group; L' is a phosphine, carbonyl or amino ligand.

2. The process as claimed in claim 1, wherein the reaction is carried out at a temperature from 50° to 100° C. and at atmospheric pressure.

3. The process as claimed in claim 1, wherein the catalyst is used in a moistened condition.

4. The process as claimed in claim 1, wherein hydrogen and $CO_2$ are prepared by catalytic conversion of water gas.

5. The process as claimed in claim 1, wherein L is a phosphine as coordinating group, an alkoxysilane, alkoxyaluminum, alkoxy titanium or alkoxyboron group as inorganic network forming group; L' is a phosphine, carbonyl or amino ligand; X is a halide, hydride, alcoholate anion or anion of organic or inorganic acids; a has the value 1, 2 or 3; b has the value 0, 1 or 2; and d is the number 1, 2, 4 or 6.

6. The process as claimed in claim 1, wherein L is a phosphine group as coordinating group, and alkoxysilane, alkoxyaluminum, alkoxytitanium and alkoxyboron group as inorganic network forming group; L' is selected from CO, NO, $P(C_6H_5)_3$, $As(C_6H_5)_3$, phosphite, amine, sulfide, olefin, diolefin, acetylene, nitrile, isonitrile, cyanate, isocyanate and water; X is selected from chloride, bromide, iodide, nitrate, acetylacetonate, acetate, trifluoroacetate, tri-chloroacetate, propionate, methoxide, ethoxide, propoxide, butoxide, phenolate, perchlorate, tetraphenylborate, hexafluorophosphate, methanide, ethanide, propanide, butanide, benzenide and perfluorbenzenide ions and hydride; a has the value 1, 2 or 3; and b has the value 0, 1 or 2.

7. The process as claimed in claim 6, wherein L is

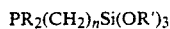

$PR_2(CH_2)_nSi(OR')_3$ in which R denotes $C_1$–$C_6$ alkyl, $C_6$ cycloalkyl, $C_6$–$C_{10}$ aryl or benzyl; R' is $C_1$–$C_6$ alkyl and n has a value from 1 to 10: R and R' being the same or different.

8. The process according to claim 7, wherein the rhodium complex to be polycondensated has the formula
$Rh(CO)Cl[P(C_6H_5)_2CH_2CH_2Si)OC_2H_5)_3]_2$,
$RhCl_3[P(C_6H_5)_2CH_2CH_2Si(OC_2H_5)_3]_2$ or
$Rh(CO)Cl[P(C_2H_5)_2CH_2CH_2Si(OC_2H_5)_3]_2$.

9. The process as claimed in claim 8, wherein the inorganic network-forming agent is $Si(OC_2H_5)_4$.

10. The process of claim 1, wherein the reaction temperature is in the range from 10°–200° C.

11. The process of claim 1, wherein the reaction pressure is in the range from 0.001–300 bar.

12. The process of claim 1, wherein said polycondensation of one or more rhodium complexes occurs with one or more inorganic network-forming agents capable of undergoing polycondensation wherein said network forming agent is a compound of silicon, titanium, aluminum, boron, or mixtures thereof, and is capable of undergoing polycondensation.

13. A process for the catalytic conversion of $CO/H_2O$ mixtures to $CO_2$ or a mixture thereof with $H_2$, using rhodium complex catalysts, which process comprises carrying out the reaction in the presence of solid, polymer rhodium complex catalysts, which are insoluble in aqueous and organic solvents obtained by polycondensation of one or more rhodium complexes having at least one ligand which contains at least one group capable of coordinating to rhodium and at least one group forming an inorganic network in the polycondensation with itself;

wherein the rhodium complex has the general formula II:

$(L'_bRhX_{c'})_dL''_a$ (II)

in which L'' is a ligand containing an ionic group capable of coordinating to rhodium and a group forming an inorganic network in the polycondensation; L' is a electron-donating ligand; X is an organic or inorganic anion necessary for charge neutralization, a has a value necessary to neutralize the charge of the complex anion or cation; b has a value from 0 to 4; c' has a value from 0 to 6, the sum of (b+c') being smaller than or equal to 6; and d is a whole number having a value greater than or equal to 1; and wherein L'' is an ammonium group as coordinating group, an alkoxysilane, alkoxyaluminum, alkoxytitanium or alkoxyboron group as inorganic network forming group; L' is a phosphine, carbonyl or amino ligand.

14. The process as claimed in claim 13, wherein L'' is an ammonium group as coordinating group, an alkoxysilane, alkoxyaluminum, alkoxytitanium or alkoxyboron group as inorganic network forming group; L' is a phosphine, carbonyl or amino ligand; X is a halide, hydride or alcoholate anion or is an anion of organic or inorganic acids; and b has the value 0, 1 or 2.

15. The process as claimed in claim 13 wherein L'' is an ammonium group as coordinating group and an alkoxysilane, alkoxyaluminum, alkoxytitanium or alkoxyboron group as inorganic network forming group; L' is selected from CO, NO, $P(C_6H_5)_3$, $As(C_6H_5)_3$, phosphite, amine, sulfide, olefin, diolefin, acetylene, nitrile, isonitrile, cyanate, isocyanate and water; X is selected from chloride, bromide, iodide, nitrate, acetylacetonate, acetate, trifluoroacetate, tri-chloroacetate, propionate, methoxide, ethoxide, propoxide, butoxide, phenolate, perchlorate, tetraphenylborate, hexafluorophosphate, methanide, ethanide, propanide, butanide, benzenide and perfluorbenzenide ions and hydride; a has the value 0, 1 or 2; b has the value 1, 2 or 3; and d is the number 1, 2, 4 or 6.

16. The process as claimed in claim 15, wherein L'' has the general formula

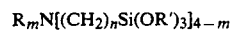

$R_mN[(CH_2)_nSi(OR')_3]_{4-m}$ in which R denotes hydrogen, $C_1$–$C_6$ alkyl, $C_6$ cycloalkyl, $C_6$–$C_{10}$ aryl or benzyl; R' represents $C_1$–$C_6$ alkyl; m has a value from 0 to 3 and n has a value from 1 to 10.

17. A process as claimed in claim 16, wherein the rhodium complex to be polycondensated has the formula

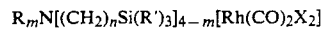

$R_mN[(CH_2)_nSi(R')_3]_{4-m}[Rh(CO)_2X_2]$ in which
R denotes hydrogen, alkyl, cycloalkyl, aryl or arylalkyl;

R' represents alkyl;

X is a halide anion;

n has a value from 1 to 10, preferably the values 1, 2, 3 or 4; and m has a value from 0 to 3, preferably the value 1, 2 or 3.

18. The process as claimed in claim 17 wherein the rhodium complex to be polycondensated has the formula

$CH_3(_3N[(CH_2)_3Si(OCH_3)_3][Rh(CO)_2Cl_2]$.

19. The process as claimed in claim 18, wherein the inorganic network-forming agent is $Si(OC_2H_5)_4$.

20. The process as claimed in claim 13, wherein the reaction is carried out at a temperature from 50° to 100° C. and at atmospheric pressure.

21. The process as claimed in claim 13, wherein the catalyst is used in a moistened condition.

22. The process as claimed in claim 13, wherein hydrogen and $CO_2$ are prepared by catalytic conversion of water gas.

23. The process of claim 13, wherein the reaction temperature is in the range from 10°–200° C.

24. The process of claim 13, wherein the reaction pressure is in the range from 0.001–300 bar.

25. The process of claim 13, wherein said polycondensation of one or more rhodium complex occurs with one or more inorganic network-forming agents capable of undergoing polycondensation wherein said network forming agent is a compound of silicon, titanium, aluminum, boron, or mixtures thereof, and is capable of undergoing polycondensation.

* * * * *